US005886635A

United States Patent [19]

Landa et al.

[11] Patent Number: 5,886,635

[45] Date of Patent: Mar. 23, 1999

[54] OVERBOARD ALARM WITH LOCALIZATION SYSTEM INTERFACE

[75] Inventors: Joseph S. Landa; Charles K. Collins, both of Alexandria, Va.

[73] Assignee: BriarTek, Inc., Alexandria, Va.

[21] Appl. No.: 902,631

[22] Filed: Jul. 29, 1997

[51] Int. Cl.$^{6}$ .................................................... G03B 21/00

[52] U.S. Cl. ...................... 340/573.6; 340/539; 340/984; 342/357

[58] Field of Search .................................... 340/573, 539, 340/984; 342/357

[56] References Cited

U.S. PATENT DOCUMENTS

| | | | |
|---|---|---|---|
| 4,714,914 | 12/1987 | Boe | 340/573 |
| 5,021,765 | 6/1991 | Morgan | 340/573 |
| 5,029,293 | 7/1991 | Fontanille | 340/573 |
| 5,059,952 | 10/1991 | Wen | 340/573 |
| 5,311,100 | 5/1994 | Brain | 315/129 |
| 5,389,934 | 2/1995 | Kass | 342/357 |
| 5,408,238 | 4/1995 | Smith | 342/357 |
| 5,463,598 | 10/1995 | Holland et al. | 367/131 |
| 5,517,199 | 5/1996 | DiMattei | 342/357 |
| 5,528,248 | 6/1996 | Steiner et al. | 342/357 |
| 5,619,187 | 4/1997 | Serfontein | 340/573 |
| 5,640,157 | 6/1997 | Langeraar | 340/573 |

*Primary Examiner*—Glen Swann

*Attorney, Agent, or Firm*—Rabin & Champagne, P.C.

[57] ABSTRACT

An overboard alarm system includes a signal device and a receiving station. The signal device includes a water-activated switch, a transmitter controlled by the switch to generate a signal, an antenna for providing the signal from the transmitter, and a floatation aid for keeping an end of the antenna above water when the signal device is located in the water. The transmitter may be an RF transmitter. The receiving station includes a receiving antenna for receiving the signal transmitted by the signal device, and an interface for providing the received signal to a navigational system. The receiving station may further include a processor for formatting the received signal and for providing the formatted signal to the interface. The receiving station may further include an alarm device for providing an alarm output in response to the received signal. The processor may include means for recording the position of the receiving station when the received signal is provided to the navigational system. The processor may include means for locating the position of the signal device based on the signal transmitted by the signal device. The processor may include means for recording the position of the signal device in response to the received signal. The receiving station may include a floatation device, visual indicia, and/or a GPS transceiver that is deployable in the direction of the signal device, under control of the processor in response to the received signal.

26 Claims, 3 Drawing Sheets

OVERBOARD ALARM WITH LOCALIZATION SYSTEM INTERFACE

FIELD OF THE INVENTION

This invention relates in general to systems for tracking people or items. In particular, the present invention relates to an alarm which automatically records the event and location of a person or item that has fallen off of a ship.

BACKGROUND OF THE INVENTION

Various devices for detecting that a person has fallen off of a ship and for locating that person have been previously developed. All of these devices have significant shortfalls. Conventional inventions in this field can be classified by (1) the method used to transmit a signal from a sensor to a central receiver, or (2) the method in which the ship's personnel is alerted of the loss overboard. Most of these devices rely on radio frequency (RF) signals which propagate through the air, or on acoustic or ultrasonic signals propagating through the water. Water propagation of signals is not practical because it requires costly detection equipment not often found on a ship. RF transmission systems generally fail to produce a signal of sufficient strength to penetrate the air/water interface and still effectively alert those on the ship of the person overboard. Further, no conventional system interfaces with ship navigational equipment for recording event location.

The following four areas are of particular relevance to this type of detection system: mode of signal propagation, type of signal transmitted, complexity of the system, and the ability to determine the location of the individual who has fallen overboard.

Mode of propagation—This type of system is designed to detect the event of an individual who has fallen from a ship and into the water, therefore it must include a number of sensors, one sensor attached to each individual to be monitored, and the ability to signal the ship from the water. To signal the ship, a transmitter associated with the overboard individual can use radio waves, light, sound, or ultrasonic energy. In conventional systems, all forms of acoustic/ultrasonic energy must travel through the water to reach a sensor/receiver on the ship. Transmission through this medium is very unreliable, and the dependability of such a signal is highly dependent on the environment and on ambient noise. Reverberation effects from the water's surface, bottom, and thermal layers often mask this type of signal, or cause false alarms. Because this device is intended to provide an added measure of safety for those aboard the ship, high assurance is required. False alarms will cause the crew to react more slowly in the event of a real emergency.

Several systems are available which use lights, such as strobes or flares, to signal a ship in the event of a man overboard. These systems are inexpensive to put in place and are generally reliable. However, they require that a crew member must always be watching to observe the signal, because there is no practical way to automate this type of alarm.

Other systems, which signal the ship using a radio transmitter, fail to address the problem of the air/water interface and its effect on propagation. In low power RF devices such as those typically used in this type of system, the design and location of the antenna is one of the most important considerations in determining the range and quality of signal transmitted. In designing an event detector for this type of system, a transmitter and a water detector both must be located on or near the individual. If the transmitter is submerged for activation, and the antenna is below the air/water interface, the signal will not propagate the distance required to the ship with signal strength sufficient to deliver meaningful information.

Type of signal—Alarms on board the ship can be triggered by a signal, or by the absence of a signal indicating that everything is normal. Systems which depend on the interruption of a signal are generally not acceptable for ships with large numbers of people on board, since each individual would need a signal source and each signal source would have to be monitored. Additionally, this type of device would have to be active at all times, causing a drain on power supplies. This type of signal device would also cause many false alarms, since interference and environment can occasionally cause signals to drop out.

Complexity—Systems which use sonar or ultrasonic energy to transmit signals require significant amounts of equipment. Sonar sensors need to be mounted away from the ship's hull and other sources of noise, interference, and multipath. Additionally, acoustic and ultrasonic signals require complicated signal processing to determine the nature of the signal and to separate the signal from ambient noise.

Localization—Conventional systems signal the event of a person falling overboard but do not record the location and exact time of the event, and therefore cannot accurately plot the person's position. Systems which send a signal for localization are limited because the ship must be in range of the transmitter at all times or risk permanently losing the individual.

SUMMARY OF THE INVENTION

It is therefore an objective of the present invention to provide a system for quickly and reliably detecting the event of a person or item falling overboard from a ship.

It is a further objective of the present invention to provide a system for accurately detecting the location of a person who has fallen overboard from a ship.

It is an additional objective of the present invention to provide a system for detecting the event and location of a person falling overboard from a ship that interfaces with the navigational system of the ship or with another navigational system, in order to monitor the monitor the location of the person while accounting for factors such as drift.

In order to overcome the deficiencies of conventional systems, the present invention provides the user with an antenna which extends over the air/water interface to enable the alarm signal to propagate through the air to a moving ship. Additionally, the system of the present invention incorporates an interface with the ship's navigational system which triggers an overboard alarm and records position and time data of the event using, for example, GPS.

The system includes a signal device and a receiving station. The signal device includes a water-activated switch, a transmitter controlled by the switch to generate a signal, an antenna for providing the signal from the transmitter, and a flotation aid for keeping an end of the antenna above water when the signal device is located in the water. The transmitter may be an RF transmitter. The receiving station includes a receiving antenna for receiving the signal transmitted by the signal device, and an interface for providing the received signal to a navigational system. The receiving station may further include a processor for formatting the received signal and for providing the formatted signal to the interface. The receiving station may further include an alarm device for providing an alarm output in response to the received signal. The processor may include means for recording the position of the receiving station when the received signal is provided to the navigational system. The processor may include means for locating the position of the signal device based on the signal transmitted by the signal device. The processor may include means for recording the position of the signal device in response to the received signal. The receiving station may include a flotation device, visual indicia, and/or a GPS transceiver that is deployable in the direction of the signal device, under control of the processor in response to the received signal.

In an alternative embodiment, the signal device for an overboard alarm may include a water-activated switch, a transmitter controlled by the switch to generate a signal, and a transmission output port for providing a conducting contact between the transmitter and a user's skin.

One aspect of the present invention is a method of detecting an overboard event, which includes transmitting an overboard signal from a location above a body of water when an overboard event occurs in the body of water, receiving the overboard signal at a remote location, and providing the received overboard signal to a navigational system. The method may further include providing an alarm output in response to the received overboard signal. The method may further include recording the position of the remote location when the received overboard signal is provided to the navigational system. The method may further include locating the position of the overboard event based on the transmitted overboard signal. The method may further include recording the position of the overboard event in response to the received overboard signal. The method may further include deploying a flotation device, visual indicia, and/or a GPS transceiver in the direction of the overboard event, in response to the received overboard signal.

BRIEF DESCRIPTION OF THE DRAWING FIGURES

These and other objectives and advantages of the present invention will be apparent from the following detailed description, with reference to the drawings, in which FIG. 1 shows a person that has fallen overboard from a ship;

DETAILED DESCRIPTION OF THE PRESENT INVENTION

The system of the present invention includes a transmitting device associated with a person, and a receiving station for receiving a signal transmitted by the transmitting device. The transmitting device includes a signal transmitter, such as an FM transmitter, an antenna or contact for an antenna, and a switch that is preferably water-activated. The transmitting device should be attachable to the person with whom it is associated. The device can be suspended around the neck of the person by a cord or chain, may be attached to a ring or ankle bracelet, or may be attached to the person's clothing, such as by a safety pin. The signal produced by each transmitting device may be identifiable in some way, such as by utilizing different frequencies or pulse durations. In this way, when the signal is detected it can be used to identify the person with whom the transmitting device is associated. Of course, the transmitting device may be attached to cargo instead, to warn when items being shipped have fallen overboard.

The receiving station receives the signal from the transmitting device and processes the signal. For example, the receiving station recognizes the signal as an overboard signal. Further, if each transmitting device is individually identifiable, the receiving station may process the received signal to determine which transmitter is in the water. The receiving station also includes an alarm output for providing an indication that an overboard signal has been received. The alarm output may provide an audio signal, a flashing light, or any other indicia that a signal has been received. The receiving station further may include an interface with the ship's navigational system in order to get GPS, Loran, or other geographical location data for the transmitting device and therefore for the person who fell overboard. Reception of the overboard signal may also trigger deployment of aids in the recovery of the overboard person. Such aids may include flares, a flotation device, or a GPS transmitter for continuous accurate tracking of the overboard person. The additional GPS transmitter would help locate the overboard person even the rescue effort takes a long time and the person drifts.

Many different types of water-activated switches may be used to actuate the transmitting device. For example, a spring-loaded switch may be used that includes a water-soluble tablet located between contact elements of the switch. While the switch remains dry, the tablet prevents the switch from closing and the transmitter is disabled. Once in the water, the tablet dissolves, allowing the switch to close and the signal to be transmitted. Preferably, the tablet utilizes a binder that allows the tablet material to dissolve quickly, within five seconds for example, so that the event of a person overboard may be swiftly detected.

Figure 1:
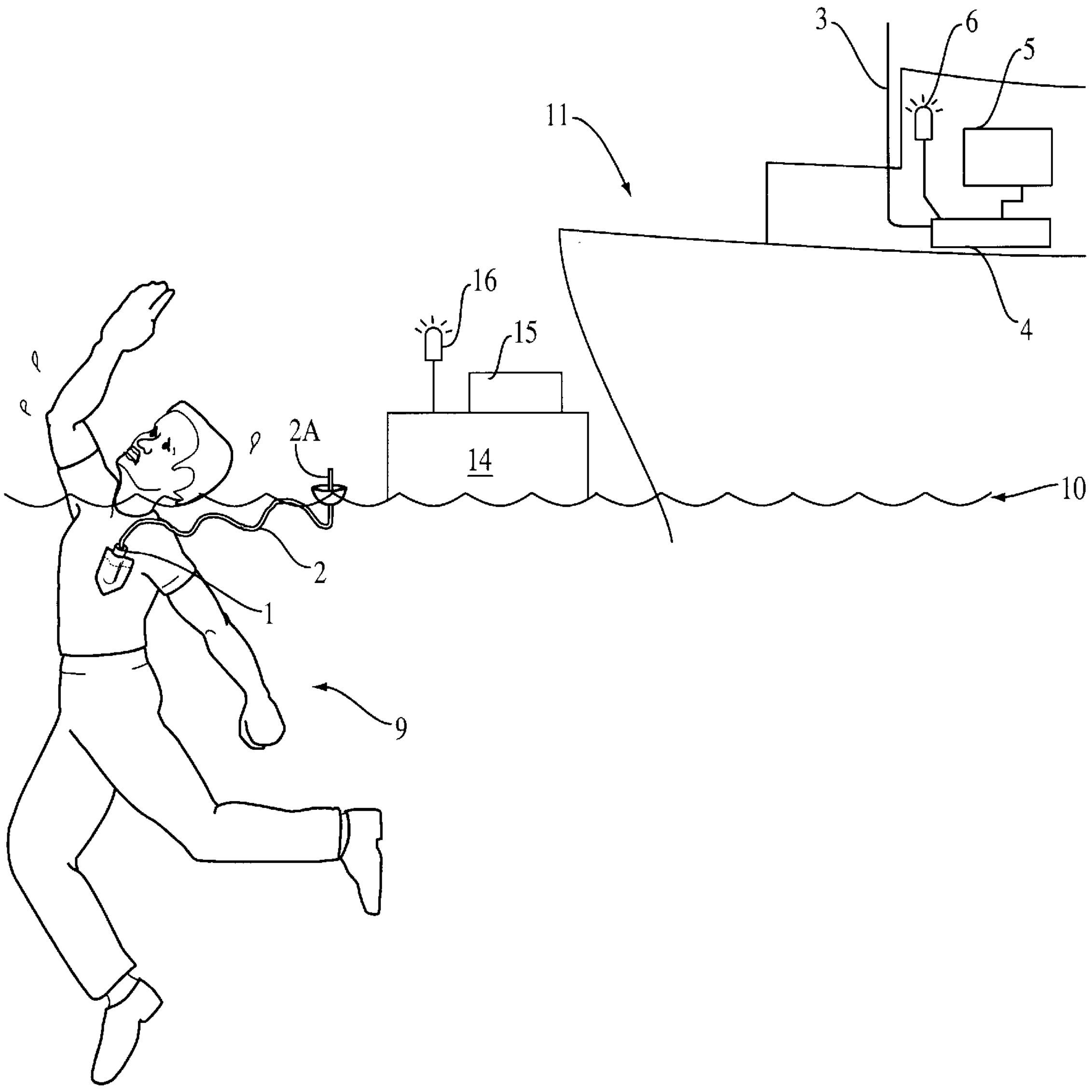

Referring to FIG. 1, a signal device 1 is shown attached to a man 9 who has fallen overboard from a ship 11. An antenna 2 is attached to the signal device 1. As shown, an end 2*a* of the antenna rises above the air/water interface 10 so that a signal may be transmitted through the air to the ship 11. The end 2*a* of the antenna 2 which protrudes from the water has the geometry necessary to properly transmit the overboard signal. Preferably, the antenna 2 transmits in an omnidirectional pattern, so that the person wearing the signal device 1 does not have to orient himself so as to direct the signal to the ship 11. Altematively, in military applications, a directional antenna may be preferable, so that the signal may be directed toward a friendly ship and away from an enemy ship.

Figure 2:
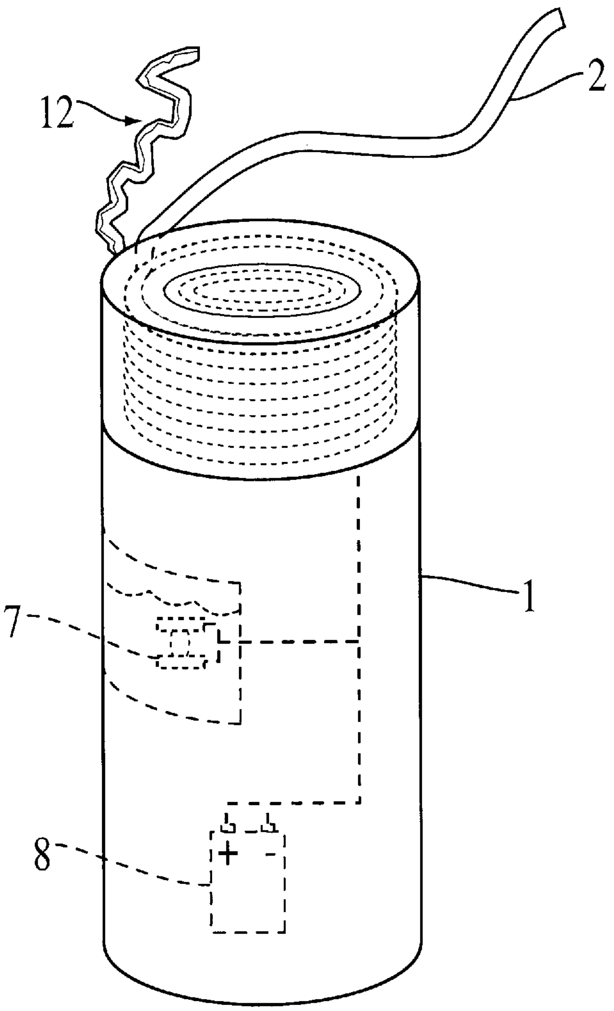
FIG. 2 shows an exemplary transmitter device of the present invention.

FIG. 2 shows an exemplary signal device 1. The antenna 2 is originally wound around the signal device 1, held in place by a disintegrating cover 12. The cover 12 dissolves when it comes in contact with water, enabling the antenna to unwind and spread away from the signal device 1. Preferably, a flotation aid is attached near the tip of the antenna 2 to assist the antenna in crossing the water/air interface. The flotation aid may be shaped such that the tip of the antenna 2 is always above the water once the flotation aid has floated to the top of the water.

Figure 3:
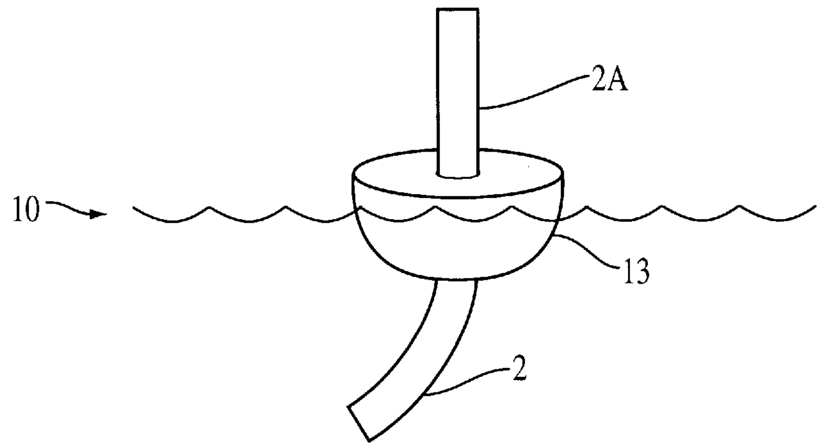
FIG. 3 shows an exemplary antenna configuration of the present invention.

For example, FIG. 3 shows the tip 2*a* of the antenna 2 attached to a flotation aid 13, in the shape of a semi-sphere. The antenna 2 passes through the flotation aid 13 via a bore, entering through the convex side and protruding from the flat side. The antenna 2 is attached to the flotation aid 13 or is prevented from backing through the bore in some other manner, so that at least a predetermined fixed length of antenna material protrudes above the flotation aid 13. The flotation aid 13 floats convex side down, so that the antenna tip 2*a* always rises above the water.

The signal device 1 itself is actuated by a water activated switch 7. This switch 7 closes the circuit between the signal output of the signal device 1 and a battery 8 or other power source located in or on the signal device 1, when the signal device 1 is in contact with the water.

A nearby ship is equipped with a receiving antenna 3. This antenna 3 will receive the overboard signal from the signal device 1 and provide the signal to a central receiver processor 4 on board the ship. The central receiver processor 4 interfaces with the navigation system 5 of the ship, which may be, for example, a GPS or Loran system. The central receiver processor 4 receives the overboard signal from the antenna 3 and formats it for the navigational system 5. Thus, the signal source location, and therefore the location of the person who fell overboard, can be determined and documented. The recorded location can then be used to retrieve the overboard person, by tracking his location from the time he fell into the water until the time that rescue personnel can reach him. The central receiver processor 4 also initiates an alarm 6 when the overboard signal is received. The alarm 6 may be audio and/or visual. Reception of the overboard signal may also cause a marking float 14 to be released. This marking float 14 may include a higher power signal transmitter, GPS transceiver 15, and visual indicia 16 to help track the drift of the person in the water.

It should be noted that the receiving station does not have to be located on a ship. For example, it may be located on a pier nearby to an area where a number of pleasure craft dock. It could also be located in an enclosure on the shores of a bay, in a lighthouse, or anywhere it would be useful and practical to implement the system of the present invention.

While the present invention has been described by way of example and in terms of preferred and alternative embodiments, it is to be understood that the present invention is not limited to the disclosed embodiments. To the contrary, it is intended to cover various modifications and similar arrangements. Therefore, the appended claims should be accorded the broadest interpretation so as to encompass all such modifications and similar structures.

What is claimed is:

1. An overboard alarm, comprising:

a signal device; and a receiving station;

wherein the signal device includes a water-activated switch, a transmitter controlled by the switch to generate a signal, an antenna for providing the signal from the transmitter, and a flotation aid for keeping an end of the antenna above water when the signal device is located in the water; and wherein the receiving station includes a receiving antenna for receiving the signal transmitted by the signal device, an interface for providing the received signal to a navigational system, a processor. including means for locating the position of the signal device based on the signal transmitted by the signal device, for formatting the received signal and for providing the formatted signal to the interface, and a flotation device that is deployable in the direction of the signal device. under control of the processor in response to the received signal.

2. The overboard alarm of claim 1, wherein the receiving station further includes an alarm device for providing an alarm output in response to the received signal.

3. The overboard alarm of claim 1, wherein the transmitter is an RF transmitter.

4. The overboard alarm of claim 1, wherein the processor includes means for recording the position of the receiving station when the received signal is provided to the navigational system.

5. The overboard alarm of claim 1, wherein the processor includes means for recording the position of the signal device in response to the received signal.

6. The overboard alarm of claim 1, wherein the receiving station includes visual indicia deployable in the direction of the signal device, under control of the processor in response to the received signal.

7. The overboard alarm of claim 1, wherein the receiving station includes a GPS transceiver that is deployable in the direction of the signal device, under control of the processor in response to the received signal.

8. A signal device for an overboard alarm, comprising:

a) a water-activated switch;

b) a transmitter controlled by the switch to generate a signal;

c) an antenna for providing the signal from the transmitter, wherein the antenna includes a restrictive cover that disintegrates upon contact with water; and d) a flotation aid for keeping an end of the antenna above water when the signal device is located in the water.

9. The signal device of claim 8, wherein the transmitter is an RF transmitter.

10. A signal device for an overboard alarm, comprising:

a) a water-activated switch;

b) a transmitter controlled by the switch to generate a signal; and c) a transmission output port for providing a conducting contact between the transmitter and a user's skin.

11. The signal device of claim 10, wherein the transmitter is an RF transmitter.

12. A receiving station for an overboard alarm system, comprising:

a) a receiving antenna for receiving a signal from a signal device; and b) an interface for providing the received signal to a navigational system.

13. The receiving station of claim 12, wherein the receiving station further includes a processor for formatting the received signal and for providing the formatted signal to the interface.

14. The receiving station of claim 13, wherein the processor includes means for recording the position of the receiving station when the received signal is provided to the navigational system.

15. The receiving station of claim 13, wherein the processor includes means for locating the position of the signal device based on the signal transmitted by the signal device.

16. The receiving station of claim 15, wherein the processor includes means for recording the position of the signal device in response to the received signal.

17. The receiving station of claim 15, wherein the receiving station includes a flotation device that is deployable in the direction of the signal device, under control of the processor in response to the received signal.

18. The receiving station of claim 15, wherein the receiving station includes visual indicia deployable in the direction of the signal device, under control of the processor in response to the received signal.

19. The receiving station of claim 15, wherein the receiving station includes a GPS transceiver that is deployable in the direction of the signal device, under control of the processor in response to the received signal.

20. The receiving station of claim 12, wherein the receiving station further includes an alarm device for providing an alarm output in response to the received signal.

21. A method of detecting an overboard event, comprising:

a) transmitting an overboard signal from a location above a body of water when an overboard event occurs in the body of water;

b) receiving the overboard signal at a remote location;

c) providing the received overboard signal to a navigational system;

d) locating the position of the overboard event based on the transmitted overboard signal; and e) deploying a flotation device in the direction of the overboard event, in response to the received overboard signal.

22. The method of claim 21, further including providing an alarm output in response to the received overboard signal.

23. The method of claim 21, further including recording the position of the remote location when the received overboard signal is provided to the navigational system.

24. The method of claim 23, further including recording the position of the overboard event in response to the received overboard signal.

25. The method of claim 21, further including deploying visual indicia in the direction of the overboard event, in response to the received overboard signal.

26. The method of claim 21, further including deploying a GPS transceiver in the direction of the overboard event, in response to the received overboard signal.

* * * * *